United States Patent
Weisang et al.

(10) Patent No.: US 9,034,478 B2
(45) Date of Patent: May 19, 2015

(54) METHOD FOR MAKING A SHEET OF DEGRADABLE PAPER, USE OF SAID SHEET FOR MAKING A MANDREL DEFINING A ROLL CARRIER, DEGRADABLE PAPER SHEET, AND MANDREL INCLUDING AT LEAST ONE OF SAID SHEETS

(75) Inventors: Nicolas Weisang, Colmar (FR); Frederic Roesch, Colmar (FR); Benoit Hoeft, Bischwihr (FR)

(73) Assignee: SCA Tissue France, Saint-Quen (FR)

( * ) Notice: Subject to any disclaimer, the term of this patent is extended or adjusted under 35 U.S.C. 154(b) by 677 days.

(21) Appl. No.: 13/140,382

(22) PCT Filed: Dec. 16, 2009

(86) PCT No.: PCT/EP2009/067324
§ 371 (c)(1),
(2), (4) Date: Aug. 4, 2011

(87) PCT Pub. No.: WO2010/070009
PCT Pub. Date: Jun. 24, 2010

(65) Prior Publication Data
US 2011/0287273 A1 Nov. 24, 2011

(30) Foreign Application Priority Data
Dec. 18, 2008 (FR) ...................................... 08 58809

(51) Int. Cl.
*B32B 23/04* (2006.01)
*B32B 23/08* (2006.01)
(Continued)

(52) U.S. Cl.
CPC . *B32B 29/00* (2013.01); *B31C 1/00* (2013.01); *B32B 7/12* (2013.01); *B65H 75/10* (2013.01);
(Continued)

(58) Field of Classification Search
USPC ................................... 428/532, 536; 427/391
IPC ................................... B32B 23/04,23/08, 38/16
See application file for complete search history.

(56) References Cited

U.S. PATENT DOCUMENTS

| | | |
|---|---|---|
| 1,824,421 A | 9/1931 | Allen |
| 3,580,253 A | 5/1971 | Bernardin |

(Continued)

FOREIGN PATENT DOCUMENTS

| | | |
|---|---|---|
| DE | 4431755 A1 | 3/1996 |
| EP | 0 372 388 | 6/1990 |

(Continued)

OTHER PUBLICATIONS

PCT International Search Report and Written Opinion for International Application No. PCT/EP2009/067324; International Filing Date: Dec. 16, 2009.

(Continued)

*Primary Examiner* — Leszek Kiliman
(74) *Attorney, Agent, or Firm* — Drinker Biddle & Reath LLP

(57) ABSTRACT

A method for making a water-degradable paper sheet involves the following: providing at least one strip of a water-soluble binding material in the form of a dry film; providing at least two strips each made of at least one ply of cellulose wadding; placing the strip of water-soluble binding material between the two strips of cellulose wadding; humidifying, assembling and pressing the three strips; and drying the complex strip thus obtained. The sheet thus obtained can be used for making a roll carrier mandrel by helically winding one or more strips from the sheet about a cylinder. Articles produced from the sheet can particularly be used in the field of products for sanitary or domestic use.

14 Claims, 1 Drawing Sheet

(51) Int. Cl.
*B32B 38/16* (2006.01)
*B32B 29/00* (2006.01)
*B31C 1/00* (2006.01)
*B32B 7/12* (2006.01)
*B65H 75/10* (2006.01)
*B65H 75/50* (2006.01)
*D21H 27/32* (2006.01)
*D21H 19/22* (2006.01)
*D21H 19/32* (2006.01)
*D21H 21/18* (2006.01)
*D21H 23/56* (2006.01)

(52) U.S. Cl.
CPC .......... *B65H 75/50* (2013.01); *B65H 2701/522* (2013.01); *D21H 19/22* (2013.01); *D21H 19/32* (2013.01); *D21H 21/18* (2013.01); *D21H 23/56* (2013.01); *D21H 27/32* (2013.01)

(56) References Cited

U.S. PATENT DOCUMENTS

| | | | | |
|---|---|---|---|---|
| 4,473,368 | A * | 9/1984 | Meyer | 493/34 |
| 5,242,545 | A | 9/1993 | Bradway et al. | |
| 5,576,364 | A | 11/1996 | Isaac et al. | |
| 5,736,209 | A | 4/1998 | Andersen et al. | |
| 6,168,857 | B1 * | 1/2001 | Andersen et al. | 428/292.1 |
| 6,200,404 | B1 * | 3/2001 | Andersen et al. | 156/245 |
| 6,818,101 | B2 | 11/2004 | Vinson et al. | |
| 7,951,440 | B2 * | 5/2011 | Butler, III | 428/36.9 |
| 8,075,699 | B2 * | 12/2011 | Butler, III | 134/22.1 |
| 2002/0084045 | A1 | 7/2002 | Collias et al. | |
| 2002/0096287 | A1 | 7/2002 | Jewell et al. | |
| 2006/0037724 | A1 | 2/2006 | Akai et al. | |
| 2007/0048474 | A1 | 3/2007 | Butler, III et al. | |
| 2009/0075001 | A1 | 3/2009 | O'Neill | |
| 2011/0305855 | A1 | 12/2011 | Graff et al. | |
| 2012/0035526 | A1 | 2/2012 | Colin et al. | |
| 2012/0089075 | A1 | 4/2012 | Colin et al. | |

FOREIGN PATENT DOCUMENTS

| | | | |
|---|---|---|---|
| EP | 0 415 385 | | 3/1991 |
| EP | 0 438 672 | | 7/1991 |
| EP | 0 639 381 | | 2/1995 |
| EP | 1 459 876 | | 9/2004 |
| EP | 1459876 | A2 | 9/2004 |
| EP | 1 630 288 | | 3/2006 |
| EP | 630288 | * | 3/2006 |
| GB | 691 552 | | 5/1953 |
| GB | 2202750 | | 10/1988 |
| WO | 0006462 | A1 | 2/2000 |
| WO | WO 01/21121 | | 3/2001 |
| WO | WO 01/74939 | | 10/2001 |
| WO | 0247998 | A1 | 6/2002 |

OTHER PUBLICATIONS

PCT International Search Report for International Application No. PCT/EP2009/067270; International Filing Date: Dec. 16, 2009 (6 pages).

PCT Written Opinion for International Application No. PCT/EP2009/067270; International Filing Date: Dec. 16, 2009 (11 pages).

English Translation of the Written Opinion of the International Searching Authority Issued in PCT/IB2010/002190 on Feb. 24, 2011 (8 pages).

PCT International Search Report for International Application No. PCT/IB2010/002190; International Filing Date: Jun. 11, 2010; Date of Mailing: Feb. 24, 2011 (3 pages).

France Search Report for Application No. 09 03827; Filing date: Aug. 3, 2009; Completion date: Feb. 25, 2010 (2 pages).

English Translation of the Written Opinion of the International Searching Authority Issued in PCT/IB2010/002165 on May 19, 2011 (8 pages).

PCT International Search Report for International Application No. PCT/IB2010/002165; International Filing Date: Jun. 11, 2010; Date of Mailing: Feb. 25, 2011 (4 pages).

* cited by examiner

METHOD FOR MAKING A SHEET OF DEGRADABLE PAPER, USE OF SAID SHEET FOR MAKING A MANDREL DEFINING A ROLL CARRIER, DEGRADABLE PAPER SHEET, AND MANDREL INCLUDING AT LEAST ONE OF SAID SHEETS

BACKGROUND OF THE INVENTION

The present disclosure relates to the manufacture of a sheet of disintegrable paper and its use for manufacturing a core forming a roll support. It relates in particular to the field of paper for sanitary or household use, packaged in rolls with cores.

Papers for sanitary or household use, such as toilet paper, wiping paper or household roll towels, are sometimes packaged in rolls with cores.

The core is a cylinder, generally made from cardboard, which is discarded after the paper of the roll has been consumed. The core performs several functions:

- It serves as a support on which the sheet of paper is wound in the fabrication of the roll. In general, the rolls are manufactured from a very wide stock sheet that is wound around a tube of matching length, and the roll obtained is cut into individual rolls to the desired width.
- It keeps the central hole open by withstanding the internal stresses of the roll and by preventing the collapse of the internal windings of the roll.
- It maintains the roll in shape by withstanding the crushing forces along its axis or transverse forces to which the roll is subjected during transport or during the various handling operations before its use.
- The core is generally obtained by helical winding and bonding of one or more bands of cardboard around a cylindrical form.

Flat cardboard is an inexpensive material which can be made from recycled fibers. It is also lightweight and its mechanical strength is sufficient for this use.

However, it has the drawback of being non-reusable or unusable in another form after the roll is consumed, and of becoming a waste product.

In the case of toilet paper, it is not recommended to discard the standard core by attempting to dispose of it with the wastewater, because, although it consists mainly of paper fibers, it disintegrates slowly in contact with water and forms a plug before it can be flushed by the stream.

BRIEF DESCRIPTION OF THE INVENTION

Accordingly, it would be advantageous to produce a core for rolls which can be disposed of easily with the wastewater of a household sanitary installation.

More particularly:

- The core should preferably disintegrate in contact with water.
- The material should preferably disintegrate in the water at a sufficient speed for it to be removed before forming a plug; the speed at which it disintegrates should preferably be comparable to that of the tissue paper which constitutes the roll.
- The core should preferably have crush strength, both radially and axially, that is similar to that of the cardboard which it is intended to replace.
- The core should be as inexpensive to produce as the cardboard cores of the prior art.
- The core should be environmentally friendly.

The manufacture of the core entails the manufacture of the constituent paper sheet.

Thus, an embodiment of the invention is a method for manufacturing a sheet of paper having the property of disintegrating in water.

According to an embodiment of the invention, the method for manufacturing a sheet of paper that disintegrates in water comprises the following steps: supplying at least one band of water-soluble binder material in the form of a dry film, supplying at least two bands each formed from at least one ply of cellulose fiber, placing the band of water-soluble binder material between the two bands of cellulose fiber, wetting, joining and pressing the three bands, drying the complex band obtained.

The complex band obtained is not limited to two bands of cellulose fiber. In general, at least two bands of water-soluble binder material are joined with at least three bands of cellulose fiber, the bands of water-soluble binder material being inserted between the bands of cellulose fiber. Thus the finished sheet obtained may comprise up to, for example, 24 plies of cellulose fiber, preferably up to 10 plies.

The method of application of the film or films may vary. The same applies to the wetting of the film. For example, according to one embodiment, the method comprises at least one step in which a band of water-soluble binder material is placed on a band of cellulose fiber and the band of water-soluble binder material is wetted before placing a band of cellulose fiber on said band of water-soluble binder material.

According to one feature, the sheet comprises a quantity of water-soluble binder representing, when dry, between 20 and 70% and preferably between 25 and 50% by weight of the finished sheet.

According to one embodiment, the water-soluble binder comprises starch which is capable of conferring both dry strength and solubility in water to the sheet.

According to one feature, the basis weight of the finished sheet is between 80 and 400 $g/m^2$.

According to another feature, the sheet is calendered before drying or after drying to obtain a sheet having a thickness between 0.3 and 1.2 mm, preferably between 0.4 and 0.5 mm.

The sheet thus obtained is used for manufacturing a roll support core by helical winding of one or more bands taken from said sheet around a cylinder.

The structure of the core has the advantage of allowing controlled disintegration, combined with strength comparable to that of cardboard.

An embodiment of the invention also relates to a sheet of paper that disintegrates in water, obtained by the method disclosed herein, having a basis weight of between 80 and 400 $g/m^2$, containing 20 to 70% of water-soluble binder such as starch.

An embodiment further includes a core for rolls, consisting of a helical winding of one or more bands of paper consisting of a sheet of paper according to the invention.

BRIEF DESCRIPTION OF THE DRAWINGS

Exemplary and nonlimiting embodiments of the invention are now described in greater detail, with reference to the appended drawings in which.

DETAILED DESCRIPTION OF THE INVENTION

Figure 1:
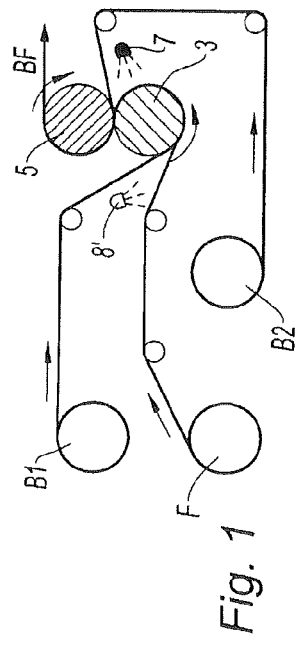
FIG. 1 shows a first installation in a side elevation view used for manufacturing a sheet of paper with the insertion of a water-soluble film, suitable for making a core in accordance with an embodiment of the invention.

According to the example of manufacture shown in FIG. 1, the installation comprises two superimposed rolls, having parallel axes and rotating about their respective axis: a smooth steel roll 3 and a roll 5 of rubber or other material. The two rolls rotate upon one another. Two bands of cellulose fiber, B1 and B2 respectively, are unwound from feed bobbins. The bands of cellulose fiber are formed from at least one ply, preferably one or two plies. The band B1 is guided to the roll 3 to which it is applied. The band B2 is guided to the roll 5, at the interval between said roll and the roll 3. A band of water-soluble binder material in the form of a water-soluble film F, placed between the two bands B1 and B2, is guided from a feed bobbin to roll 3 where it is applied against the band B1. A first applicator of liquid 7, of water, projects a measured quantity of water toward the band F, while said band bears against the band B1 on the roll 3. The binder deposited in the form of film reacts with the water applied. Due to the rotation of the roll 3, the two wetted bands B1 and F reach the interval between the two rolls, where the band B2 joins them and is superimposed on the band F. The film is thus sandwiched between the two bands. Due to the moisture and the pressing in the interval, the band of cellulose fiber B2 is joined to the band B1 through the water-soluble film F that is made tacky in the wetted state.

At the outlet of the roll 5, the complex band BF is guided from the two rolls 3 and 5, optionally to a calendering station, not shown, and a suitable drying station. In order to obtain a thick sheet, the band BF is guided to another station where another band is applied, said band being formed of a water-soluble binder material film and another band of cellulose fiber with application of a liquid to wet the film and to allow the joining by pressing.

As many bands of cellulose fiber are joined thereby with the insertion of bands of water-soluble film as required by the desired strength and thickness of the complex sheet.

When the band F is fairly thick, it may be desirable for good adhesion of the film to the cellulose fiber, to spray water in a measured quantity on the two faces of the film. The water may be applied in liquid or vapor form.

The pressing and drying, and optionally the calendering, are adjusted to obtain the desired final thickness and strength of the product.

The sheet continuously produced thereby is processed into rolls for subsequent use.

The manufacturing parameters of the sheet BF are determined so as to obtain a core having the desired properties.

The fibers used are long, short or recycled paper fibers, and also mixtures thereof.

For each band of cellulose fiber, the basis weight is between 15 and 50 g/m$^2$, preferably between 30 and 40 g/m$^2$.

According to an embodiment, the water-soluble binder is starch.

The starch comprises natural products of plant origin such as wheat, corn, potato, rice starch, tapioca, sorghum and others, consisting of high molecular weight polymers or polyholosides. In the context of an embodiment of the invention, starch also includes products derived from natural starch, converted by physical treatment, for example heating, physicochemical treatment or biological treatment, for example enzymatic, of the derivative or modified starches such as cationic, anionic, amphoteric, nonionic or cross-linked starches and products resulting from the hydrolysis of starch such as maltodextrins.

The starch is selected so that its rate of dissolution is suitable with the quantity of water added.

Other binders are feasible insofar as they perform the same function. The binder may, for example, be a polyvinyl alcohol. Other additives may also be incorporated, to provide an additional function, such as disinfectants, cleansing agents or perfumes.

The binder is preferably dyed to allow inspection of the proper distribution of the binder on the 2 faces. This also has an aesthetic advantage.

The quantity of binder in the sheet is between about 20% and about 70% of the total weight of the sheet.

The sheet calendered downstream of the press has a thickness of between 0.3 and 1.2 mm.

The incorporation of water-soluble binder in the form of a dry film has the advantage of making handling easier.

Figure 2:
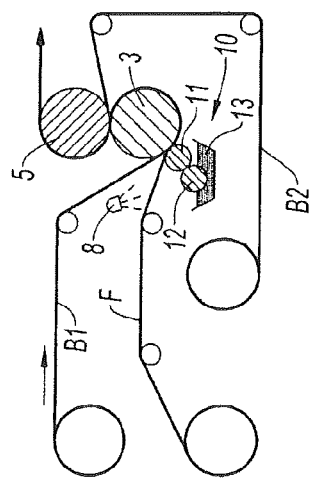
FIG. 2 shows a first alternative embodiment with a different method of application of the water to the water-soluble film in accordance with an embodiment of the invention.

FIG. 2 shows an alternative embodiment of the invention. The two rolls 3 and 5 may be observed, and the same feed of the two rolls. Water is applied here by means of an applicator 10. It comprises an engraved roll 12 immersed in a water reserve 13 with transfer to a smooth applicator roll 11 that deposits a measured quantity of water on the band F. The applicator roll 11 bears on the roll 3 via the assembly of B1 and F. If necessary, an additional quantity of water is applied by a spray 8 on the opposite side of the film F before it is pressed against the roll 3.

Figure 3:
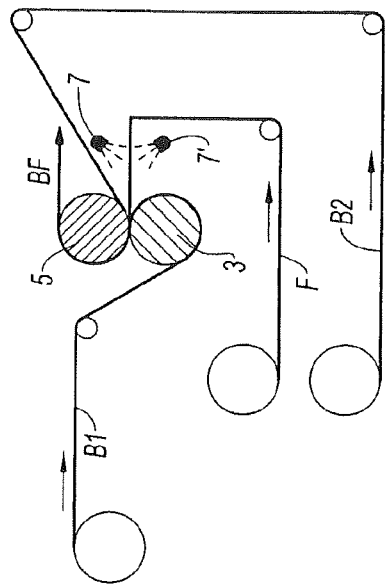
FIG. 3 shows another alternative with another method of application of the water to the water-soluble film in accordance with an embodiment of the invention.

FIG. 3 shows another alternative, in which the band formed from the water-soluble film is introduced directly into the interval between the two rolls 3 and 5, and against which the bands of cellulose fiber are pressed. Furthermore, the band F, before its joining with the two bands of cellulose fiber B1 and B2, is wetted by two water sprays 7 and 7', placed on either side of the band.

Figure 4:
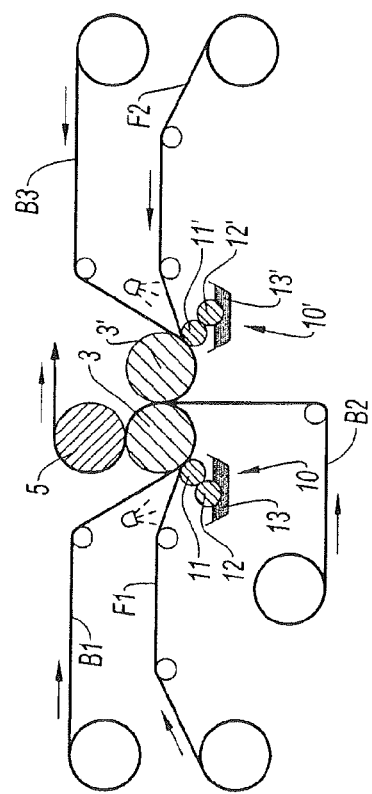
FIG. 4 shows another alternative arrangement of the rolls for making a sheet from five bands of cellulose fiber in accordance with an embodiment of the invention.

FIG. 4 shows an installation for directly manufacturing a water-soluble paper from three bands of paper B1, B2 and B3. Each of the bands is unwound from a stock bobbin, and is formed from at least one ply of cellulose fiber.

Compared to the preceding installations, a second roll 3' has been added, rotating on the roll 3. The bands of cellulose fiber B1 and B3 are guided respectively to the rolls 3 and 3'. A band of water-soluble film F1 and F2 respectively is applied to each of these two bands. At the same time, a measured quantity of water is applied to the free surface of the films by the two applicators 10 and 10'. As in the installation of FIG. 2, the applicators 10 and 10' have cylinders 12, 12' immersed in a water reserve 13, 13'. The water thus tapped off is deposited by the coating rolls 11 and 11' on the free surface of the films F1 and F2. The third band of cellulose fiber B2 is guided into the interval arranged between the two rolls 3 and 3'. Two auxiliary applicators are optionally positioned in order to wet the opposite face of the water-soluble films F1 and F2.

The bands are joined between the two rolls 3 and 3', and the assembly then passes between the roll 3 and the rubber roll 5 to undergo pressing.

Manufacture of the Core

The sheet of paper thus formed is cut into bands of low width which are helically wound around a cylindrical form. An adhesive is applied to the parts of the windings that are superimposed to bind them together and form a tube.

The technique for manufacturing cores is known per se. It is adapted to the type of binder, insofar as it is necessary to consider the rapid disintegration of the bands by the adhesive used to join the strands.

Figure 5:
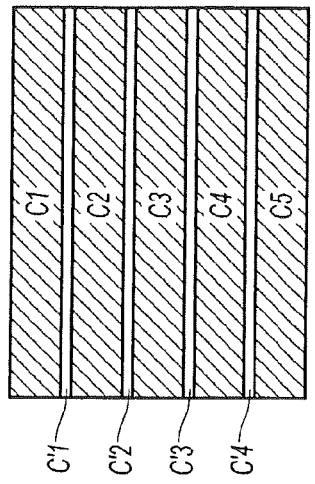
FIG. 5 shows a cross section of the structure of an embodiment of a complex sheet obtained according to an embodiment of the invention.

FIG. 5 shows a cross section of an example embodiment of a disintegrable complex sheet C according to an embodiment of the inventive method.

This structure consists of the stack of 5 plies Cn: C1 to C5 of cellulose fiber joined together by 4 adhesive layers C'n: C'1 to C'4, each prepared from a water-soluble film based on polyvinyl alcohol. The film used was type BT (low temperature) sold by Plasticos Hidrosolubles.

Each of the layers of cellulose fiber Cn had a basis weight of 34 $g/m^2$.

The weight of each of the layers C'n was 26 $g/m^2$.

It is determined that the complex sheet obtained incorporates 0.61 g of water-soluble binder per gram of cellulose fiber.

After being cut into bands, such a sheet is suitable for manufacturing a core for a paper roll.

Compression and Disintegration Tests

A cylindrical roll was then prepared from two previously formed sheets.

Diameter and length of the cylinder forming the core: 40 mm/97 mm.

Compression Test:

The flat and edge compressive strengths of the core were measured using the following method.

The core to be tested is first cut in a cylindrical portion bounded by two opposite faces, perpendicular to the axis of the cylinder, said portion having a length of 50 mm in a direction parallel to the axis.

This cylindrical portion is then positioned between the two metal plates of a dynamometer, said plates being parallel to one another and initially separated by a distance slightly greater than the length of the cylindrical portion, in the case of the edge compression measurement, or to its diameter, in the case of the flat compression measurement.

In measuring the edge compressive strength, the cylindrical portion is positioned so that the cylinder axis is perpendicular to the plane formed by one or the other of the plates.

In measuring the flat compressive strength, the cylindrical portion is positioned so that the cylinder axis is parallel to the plane formed by one or the other of the plates.

Said cylindrical portion is then pressed between the two plates, with measurements for a compression distance at which the force is recorded in Newtons.

The resistance offered by the core is simultaneously measured up to its maximum, that is to say, just before the core is irreversibly destructured.

The results were compared with those of a reference cardboard core of the one-strand type with a wall having a basis weight of 365 $g/m^2$.

It was therefore found that a core of the invention containing 0.6 g of binder per g of fibers had an edge strength at least similar to, or even greater than, that of a cardboard core, with improved compressive strength.

Since the main stresses applied to the core during its production and roll distribution cycle are essentially applied flat, the core of the invention can be considered to fully meet the requirements in this respect.

Disintegration Test:

The disintegration capacity of the core as manufactured above was measured, according to standard NF Q34-020.

It was found to disintegrate very easily.

It was also observed that the core began to disintegrate in the water faster than a similar cardboard core obtained by winding a single band of cardboard having a basis weight of 280 $g/m^2$.

The core of the invention therefore disintegrates faster than a similar cardboard core formed from a single band having a basis weight of 280 $g/m^2$, whether with or without stirring.

In the context of the present invention, similar core means a core having substantially the same diameter and the same length as the core of the invention.

Furthermore, for further comparison, the Afnor NF Q34-020 test was used to measure that the windings of a cardboard core having a basis weight of 400 $g/m^2$ (2 strands) separated after 30/60 seconds, and the core began to disintegrate after 3 minutes. It was completely disintegrated after 10 minutes but pieces of cardboard remained.

What is claimed is:

1. A method for manufacturing a sheet of paper that disintegrates in water, comprising:
   supplying at least one band of water-soluble binder material in the form of a dry film, supplying at least two bands each formed from at least one ply of cellulose fiber, placing one of the at least one band of water-soluble binder material between two consecutive bands of the at least two bands of cellulose fiber, resulting in a plurality of bands, wetting, joining and pressing the plurality of bands to form a complex band, drying the complex band obtained.

2. The method as claimed in claim 1, wherein at least two bands of water-soluble binder material are joined with at least three bands of cellulose fiber, each of the at least two bands of water-soluble binder material being inserted between two consecutive bands of the at least three bands of cellulose fiber.

3. The method as claimed in claim 1, wherein a band of the at least one band of water-soluble binder material is placed on a band of the at least two bands of cellulose fiber and the band of water-soluble binder material is wetted before placing the band of cellulose fiber on the band of water-soluble binder material.

4. The method as claimed in claim 1, wherein bands of the at least two bands of cellulose fiber comprise 2 to 24 plies of cellulose fiber.

5. The method as claimed in claim 4, wherein a quantity of water-soluble binder is added that represents, when dry, 20 to 70% by weight of a finished sheet.

6. The method as claimed in claim 5, wherein the water-soluble binder added comprises starch and/or polyvinyl alcohol.

7. The method as claimed in claim 1, wherein the basis weight of a finished sheet is between 80 and 400 $g/m^2$.

8. The method as claimed in claim 1, wherein the sheet is calendered before drying or after drying to obtain a sheet having a thickness between 0.3 and 1.2 mm.

9. A method for manufacturing a roll support core, comprising:
   helically winding one or more bands, taken from a sheet of paper, around a cylinder, the sheet of paper manufactured by a method according to the following:
   supplying at least one band of water-soluble binder material in the form of a dry film, supplying at least two bands each formed from at least one ply of cellulose fiber, placing one of the at least one band of water-soluble binder material between two consecutive bands of the at least two bands of cellulose fiber, resulting in a plurality of bands, wetting, joining and pressing the plurality of bands to form a complex band, drying the complex band obtained.

10. A sheet of paper that disintegrates in water, comprising:
a basis weight of between 80 and 400 g/m$^2$, containing 20 to 70% of a water-soluble binder, the sheet of paper manufactured by a method according to the following:
supplying at least one band of water-soluble binder material in the form of a dry film, supplying at least two bands each formed from at least one ply of cellulose fiber, placing one of the at least one band of water-soluble binder material between two consecutive bands of the at least two bands of cellulose fiber, resulting in a plurality of bands, wetting, joining and pressing the plurality of bands to form a complex band, drying the complex band obtained.

11. A core for rolls, comprising:
a helical winding of one or more bands of paper, wherein each of the one or more bands is a sheet of paper that disintegrates in water, the sheet of paper comprising a basis weight of between 80 and 400 g/m$^2$, containing 20 to 70% of a water-soluble binder, the sheet of paper manufactured by a method according to the following:
supplying at least one band of water-soluble binder material in the form of a dry film, supplying at least two bands each formed from at least one ply of cellulose fiber, placing one of the at least one band of water-soluble binder material between two consecutive bands of the at least two bands of cellulose fiber, resulting in a plurality of bands, wetting, joining and pressing the plurality of bands to form a complex band, drying the complex band obtained.

12. The method as claimed in claim 4, wherein bands of the at least two bands of cellulose fiber comprise 2 to 10 plies of cellulose fiber.

13. The method as claimed in claim 5, wherein a quantity of water-soluble binder is added that represents, when dry, 25% to 50% by weight of a finished sheet.

14. The sheet of paper as claimed in claim 10, wherein the water-soluble binder comprises starch or polyvinyl alcohol.

* * * * *